United States Patent [19]

Vaillant

[11] 4,004,101
[45] Jan. 18, 1977

[54] METHOD AND DEVICE FOR DETECTING OCCUPANCY OF TELECOMMUNICATION CHANNELS

[75] Inventor: Francois René Vaillant, Saint-Germain-en-Laye, France

[73] Assignee: Societe Anonyme de Telecommunications, France

[22] Filed: Apr. 10, 1975

[21] Appl. No.: 566,816

Related U.S. Application Data

[63] Continuation-in-part of Ser. No. 385,244, Aug. 3, 1973, abandoned.

[30] Foreign Application Priority Data

Jan. 12, 1973   France .............................. 73.01049

[52] U.S. Cl. ........................ 179/15 AS; 179/1 SA
[51] Int. Cl.[2] ........................................ G10L 1/00
[58] Field of Search ....... 179/15 AS, 18 CN, 1 VC, 179/1 SA

[56] References Cited

UNITED STATES PATENTS

| | | | |
|---|---|---|---|
| 3,508,007 | 4/1970 | Goodall | 179/18 BC |
| 3,873,926 | 3/1975 | Wright | 179/1 VC |
| 3,878,377 | 4/1975 | Fariello | 179/15 AS |

*Primary Examiner*—David L. Stewart
*Attorney, Agent, or Firm*—Robert E. Burns; Emmanuel J. Lobato; Bruce L. Adams

[57] ABSTRACT

A system for detecting the occupancy of the channels of a telecommunication network and monitoring the transmission of signals, wherein the signals on a telephone line are sampled to detect the quasi-periodic nature of speech signals for long enough to differentiate them from noise signals of a random nature.

11 Claims, 1 Drawing Figure

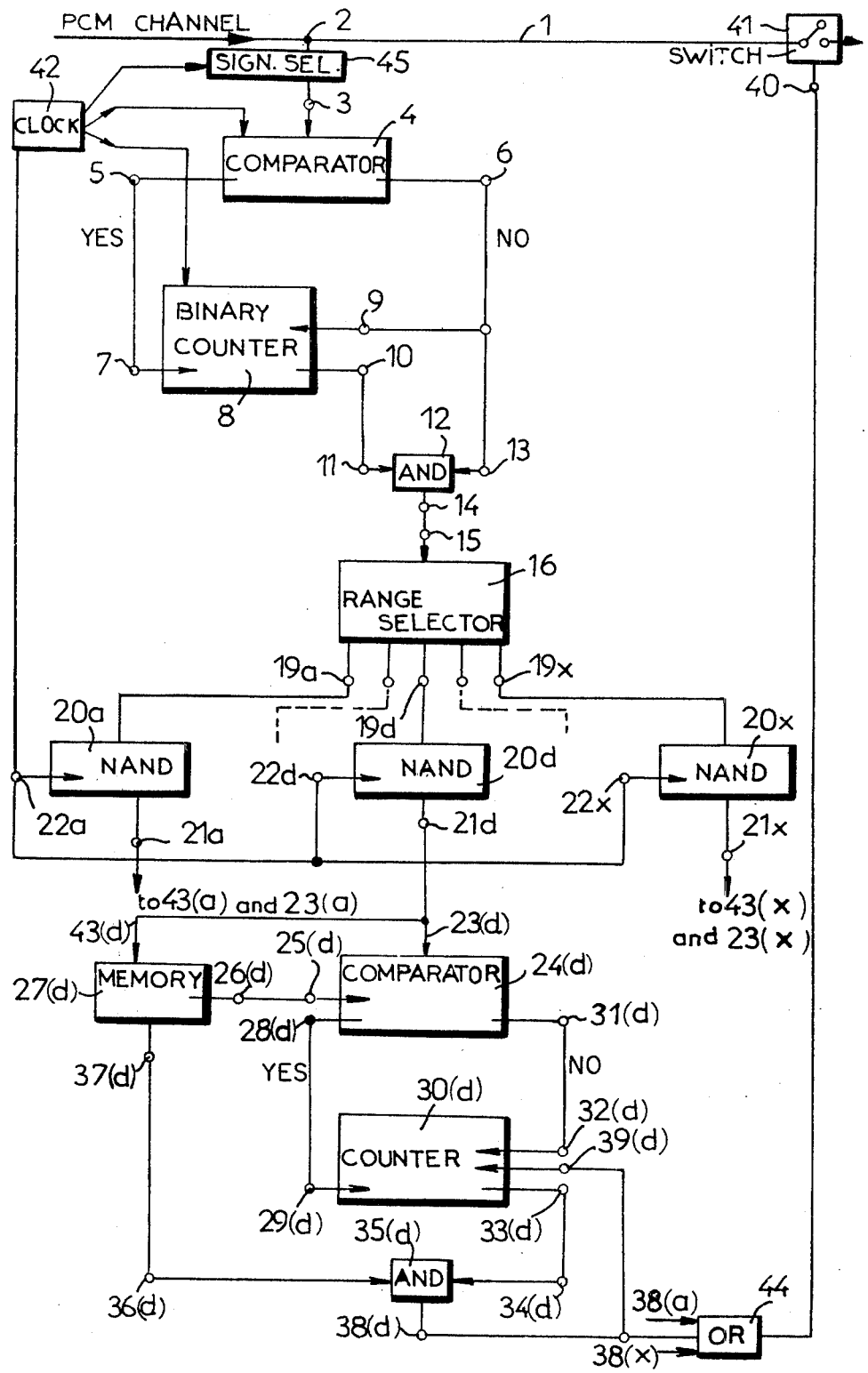

METHOD AND DEVICE FOR DETECTING OCCUPANCY OF TELECOMMUNICATION CHANNELS

The present invention is a continuation in part of my copending application Ser. No. 385,244 filed on Aug. 3, 1973 and now abandoned.

This invention is concerned with the detection of the occupancy of a telecommunication channel, particularly of a telephone line.

BACKGROUND OF THE INVENTION

In known devices, the detection of the occupancy of a telephone line is carried out by identifying the actual speech signals from amongst all the signals sampled or a telecommunication channel. Most of such devices employ one characteristic of the speech signals, namely, the pitch frequency which is the fundamental frequency at which the vocal cords vibrate during the production of different voiced speech sounds. However, such a method requires the use of a large and complex item of equipment.

FIELD OF THE INVENTION

It is well known that speech signals are quasi-periodic whereas noise signals, unless they originate from known identifiable periodic phenomena, have no periodic character, either in amplitude or in frequency.

It is an object of the invention to use this quasi-periodicity of speech signals to identify them from amongst the various signals sampled on a telephone line.

It is another object of the invention to realize a device for implementation of the method according to the invention, which is connected in parallel with a telephone line along which pass pulse code modulated (PCM) telecommunication signals, for detecting the quasi-periodicity of successive amplitude samples, taken by a known device, in order to identify whether the sampled signals are speech signals or not.

SUMMARY OF THE INVENTION

The method according to the invention comprises the steps of: extracting cyclically from samples corresponding to signal coded amplitudes, passing along a telephone line and comprising several binary cells or bits, the bit which defines the algebraic sign of each sample; counting the number $n$ of successive samples bearing the same algebraic sign, whatever the amplitude and whatever the sign; comparing this number $n$ to predetermined integer values $n_1$, $n_2$ defining several ranges $]n_1, n_2[$ of successive integer values, said ranges possibly overlapping each other, in order to select at least one range of values comprising said number $n$, the values $n_1$ and $n_2$ limiting said ranges being not included in the ranges, and said ranges of values being respectively associated to a given threshold value L empirically fixed for each range; counting the consecutive times that the different ranges of values have been respectively selected in correspondence with the first number $n$ of successive samples bearing the same sign; comparing the number of consecutive times that the different ranges have been respectively selected to the threshold value L respectively associated to the selected ranges; and deciding that all the samples concerned belong to speech signals when said number of consecutive times is at least equal to said threshold value.

The different ranges of successive integer values are respectively delimited by a lower limit value $n_1$ and an upper limit value $n_2$ which are not included in the respective range, such a range of successive values being mathematically represented by the notation $]n_1, n_2[$ which means that a selected value $n$ comprised in this range is higher than $n_1$ and lower than $n_2$, and can not be equal either to $n_1$ or to $n_2$. To each range $n_1$, $n_2$ is associated a threshold value L. This threshold value corresponds to a minimal number of consecutive appearances of $n$ successive samples having the same sign allowing to ascertain that the concerned samples have a quasi-periodic character and can be considered as belonging to speech signals.

The method according to the invention, as well as the role of its parameters $n_1$, $n_2$ and L, will be more clearly understood by introducing the notion of frequency of the signals starting from the following considerations. For a unit sampling time $\tau$, every pure sine wave of period T is such that:

$$n \leq \frac{T}{2} \cdot \frac{1}{\tau} < n+1$$

where $n$ is the number of successive signals bearing the same sign.

For a time $\tau$ of 125 microseconds, for example:

$$n \leq \frac{4000}{f} < n+1$$

Thus, to the respective limit values $n_1$ and $n_2$ of a particular range correspond respectively $n_1$ and $n_2$ successive samples bearing the same sign. These samples can be characterized by a fictive frequency $f_1$ or $f_2$ corresponding to the number of successive apparitions of samples bearing the same sign, these fictive frequencies corresponding in turn to periods $T_1$ or $T_2$. The comparison being made on the sign which may vary for each half period, all signals with successive half periods between $T_1$ and $T_2$ correspond to the selection of a same range of values defined by $n_1$ and $n_2$. Conversely, maintaining the selection of the same range implies for the signal that the successive half-periods lie between $T_1$ and $T_2$. Thus it may be seen that $n_1$ and $n_2$ play a part comparable to frequencies $f_1$ and $f_2$ delimiting the frequency filter transmission band for analogous signals.

Every occasion that the number of consecutive times that this selection is maintained is counted, the successive half-periods of the signal still lie between $T_1$ and $T_2$. The given threshold value L, for this number of consecutive times gives, as it were, a periodicity "model" which can be compared to the actual behaviour of the signal. The more the signal itself is periodic in nature, the more precise is this fit.

By considering the cause of the quasi-periodicity of the signal, two means of distinguishing the presence of a white noise are available: either there are only rarely noise components in the range $f_1$ to $f_2$, in which case L may be low, or else the presence of a noise component in this range is transitory, in which case L is given a suitably high value.

It may be mentioned incidentally that L, as a result of fluctuations in the counting values, creates cut-off zones in the filtering effect delimited by the values of $n_1$ and $n_2$. It can easily be shown that these zones are limited by the values:

$$F_1 = \frac{L}{2\tau L(n_1 - 1) + 1}$$

$$F_2 = \frac{L}{2\tau L(n_2 + 1) - 1}$$

For the implementation of the above described method, a device according to the invention is connected in parallel to a telephone communication channel along which pass pulse-code modulated telecommunication signals corresponding to amplitude samples. Each amplitude sample comprises several binary cells or bits one of which represents the sign of the sample. The input of the device according to the invention is connected to said channel and its output is connected to the control terminal of a device which can interrupt or allow transmission of the signals down line on the channel in question. It operates under the control of a clock, the timing of which is adapted to that of the bits of the samples passing along the channel. Said device comprises a clock;

a known circuit controlled by said clock and having one input and one output, said input being connected to the communication channel for extracting from the respective samples passing on said channel the bit which defines the sign of the concerned sample;

a first comparator, having a first input connected to the output of said known circuit, and first and second outputs, said comparator comparing the bit corresponding to the sign of the samples successively present on the channel with a bit corresponding to a given sign;

a first counter for the samples of the same sign, having first and second input connected to the first and second outputs of the comparator respectively, and one output, said first counter being returned to zero or continuing its counting according to the output signals of the comparator;

an AND gate having first and second inputs, connected to the second output of the comparator and the one output of the first counter respectively, and one output;

a range selector having one input, which is connected to the output of the AND gate, and several outputs, said range selector comparing the output signal of the AND gate with different integer values $n_1$ and $n_2$ respectively delimiting several ranges of values $]n_1, n_2[$;

several NAND circuits, the number of which corresponds to the number of ranges of values, each NAND circuit having a first input connected to a corresponding output of the range selector, a second input serving as enable input, and one output;

several decision circuits, the number of which corresponds to the number of NAND circuits, and comprising one input and one output, respectively, said input being connected to the output of the corresponding NAND circuit;

each of said decision circuits comprising:

a memory part having one input and first and second outputs, said input being connected to the output of the corresponding NAND circuit, a comparison circuit having first and second inputs and first and second outputs, said first and second inputs being connected to the output of the corresponding NAND circuit and to the first output of the memory part, respectively, a counting circuit having first, second and third inputs and one output, said first and second inputs being connected to the first and second outputs of the comparison circuit, respectively, and an AND gate having first and second inputs and one output, said first and second inputs being connected to the output of the comparison circuit and to the second output of the memory part, respectively, and said output being connected to the third input of the counting part;

said device further comprising an OR gate having a number of inputs corresponding to the number of decision circuits, and one output, said inputs being connected to the output of each decision circuit, respectively;

and a switch mounted in the channel and having one control input which is connected to the output of said OR gate, said switch controlling the transmission of the samples on said channel in response to the output signal of said OR gate.

The numerical value of the threshold value L respectively associated to each range is determined according to an iterative process.

Recorded-artificial words named "logatoms", satisfying to the rules of the CCITT (Comité Consultatif International Télégraphique et Téléphonique) are transmitted on a telephone channel and are tested by means of a device according to the invention, with successive values of L until to obtain, for L, an optimal value which ascertains that signals satisfying to the different conditions according to the invention are speech signals.

In an illustrative embodiment of the invention, given as an example, five ranges of values $]n_1, n_2[$ are used. These five ranges of values $]n_1, n_2[$ and the corresponding threshold values L are given in the following table:

| $]n_1, n_2[$ | Integer values comprising the range | Threshold value L |
|---|---|---|
| ]0,2[ | 1 | 8 |
| ]1,4[ | 2,3 | 16 |
| ]2,6[ | 3,4,5 | 10 |
| ]3,9[ | 4,5,6,7,8 | 10 |
| ]8,16[ | 9,10,11,12,13, 14,15 | 3 |

This choice allows the elimination of all possibility that the samples transmitted by the device according to the invention originate from a white noise.

DESCRIPTION OF EMBODIMENT

The method according to the invention and the device for implementation thereof will be understood more clearly with the aid of the following description of one particular embodiment given as an example and shown in the accompanying drawing in which the single FIGURE is a block diagram of a device for implementation of the invention.

In the FIGURE, 1 denotes a telephone communication channel of the PCM type (pulse-code modulation). The signals passing along such a PC channel are digital data comprising amplitude samples. Each sample comprises serial bits one of which defines the sign of said sample.

At a point 2 of said channel 1 is connected the input of a device 45 which selects the sign bit (bit defining the algebraic sign) of the different samples passing along the channel. Said device is controlled by a clock 42 which is synchronized with the serial data passing along the channel 1. Such a device is well known and may comprise, for example, means for identifying the beginning of each sample, such as a shift register, and branching means, such as an AND gate, which selects the desired bit.

The output signal of the device 45, which corresponds to the sign bit of a sample, is applied to the input 3 of a first comparator 4 which has a memory function and which compares the sign bit $sb_{(i+1)}$ that it receives with the sign bit $sb_i$ corresponding to the preceding sample.

That is, it determines if the identity $$sb_i = sb_{(i+1)}$$

is satisfied or not.

Said comparator 4 is controlled by the clock 42 and has two output terminals 5 and 6. A signal is generated on the first terminal 5 when said identity is satisfied, i.e. when two consecutive bits of sign are identical. A signal is generated on the the second terminal 6 when said identity is not satisfied.

The output terminal 5 is connected to a first input 7 of a first counter 8 of which a second input 9, controlling the reset of said counter, is connected to the second output 6 of the comparator 4. Said first counter 8 is a binary counter and is controlled by the clock 42.

The output terminal 10 of said counter 8, at which the number $n$ of consecutive identical signs appears in a binary coded form, is connected to a first input terminal 11 of an AND gate 12 the second input terminal 13 of which is connected to the output terminal 6 of the comparator 4. The output terminal 14 of the AND gate 12 is connected to the input terminal 15 of a range selector 16. The range selector 16 has the function of a comparator which compares the number $n$, from the AND gate 12, with the different values $n_1$ and $n_2$ respectively delimiting several ranges of values $]n_1, n_2[$ in order to determine in what range is comprised the number $n$ applied to its input. The binary counter 8 may be for example a Johnson counter the different outputs of which are respectively connected to one or several logic OR gates, which generate a signal when the outputs of the Johnson counter to which they are connected are excited, the range selector being constitued by said OR gates.

In the present embodiment five ranges, i.e. $]0,2[$, $]1,4[$, $]2,6[$, $]3,9[$, $]8,16[$, must be selected. In this case, a first OR gate corresponding to the first range has one input connected to the counting output 1 of the Johnson counter and generates a signal when said output is excited. A second OR gate, corresponding to the second range, has two inputs connected to the counting outputs 2 and 3, respectively, of the Johnson counter and generates a signal when one of said outputs is excited. A third OR gate, corresponding to the third range, has three inputs connected to the counting outputs 3, 4 and 5, respectively, of the Johnson counter and generates a signal when one of said outputs is excited. A fourth OR gate, corresponding to the fourth range, has five inputs connected to the counting outputs 4, 5, 6, 7, 8, respectively, of the Johnson counter and generates a signal when one of said outputs is excited. Finally, a fifth OR gate, corresponding to the fifth range, has seven inputs connected to the counting outputs 9, 10, 11, 12, 13, 14, 15, respectively, of the Johnson counter and generates a signal when one of said outputs is excited. This example is not limitative and the Johnson counter may be replaced by a shift register for example. Likewise the group of OR gates may be replaced by a decoder comprising NAND gates.

It is seen that the range selector 16 may generate several output signals when two ranges overlapping each other are selected. The range selector 16 has been represented with as many outputs as there are ranges of values. Said outputs are respectively connected to a first input 19a to 19x of circuits 20a to 20x corresponding to the different ranges of values, respectively. In order to simplify the drawing only the circuits 20a, 20d and 20x have been represented. The inputs of the others are indicated by dotted lines. Each of said circuits 20a to 20x is comprised by a NAND gate and comprises a second input 22a to 22x, respectively, which is the enable input. Said second inputs 22a to 22x are connected together and to the clock 42. Each of said circuits 20a to 20x is associated to a decision circuit comprising a memory part 27(a) to 27(x), a comparison circuit 24(a) to 24(x), a counting circuit 30(a) to 30(x), and an AND gate 35(a) to 35(x), respectively.

The memory parts 27(a) to 27(x) form a unitary memory 27, the comparison circuits 24(a) to 24(x) form a second comparator 24, the counting circuits 30(a) to 30(x) form a second counter 30, and the AND gates 35(a) to 35(x) form an AND circuit 35, respectively.

The memory 27 has the function to store the range of values, corresponding to one of the circuits 20a to 20x, which was previously used. Each part 27(a) to 27(x) of said memory comprises a two bits shift register.

The counting circuits 30(a) to 30(x) of the second counter 30 are comprised by binary counting circuits, respectively, at the output of which appears the corresponding threshold value L, in a binary coded form, for the associated circuits 20(a) to 20(x), respectively.

In the illustrated example it is supposed that only the circuit 20d is excited by the range selector 16. For the sake of the clarity of the drawing, only the circuit parts and the components corresponding to the circuit 20d are illustrated. These circuit parts and components are correspondingly designated by the references of the complete circuits followed by the affix d. Likewise, the circuits parts and components corresponding to the others of the circuits 20a to 20x are designated by the same references followed by the affixs a to x, respectively.

The description will be made for the part of the circuit corresponding to the circuit 20d, the functioning of the circuit parts corresponding to the others circuits 20a to 20x being the same.

As previously described, a first input 23(d) of the comparison circuit 24(d) is connected to the output 21(d) of the circuit 20(d). A second input 25(d) of the comparison circuit 24(d) is connected to a first output 26(d) of the memory part 27(d) the input 43(d) of which is also connected to the output 21(d) of the circuit 20d. Said comparison circuit 24(d) comprises a first output 28(d) which is connected to a first input 29(d) of the counting circuit 30(d).

The second comparison circuit 24(d) also comprised a second output 31(d) connected to a second input 32(d) of the counting circuit 30(d) which also comprises a third input 39(d) and an output 33(d) which is connected to a first input 34(d) of an AND gate 35(d) which belongs to an AND gate 35. The second input 36(d) of said AND gate 35(d) is connected to a second output 37(d) of the memory part 27(d). The output 38(d) of the AND gate 35(d) is connected to a third input 39(d) of the counting circuit 30(d) and to one input of an OR gate 44 which also receives the outputs 38(a) to 38(x) of AND gates 35(a) to 38(x) corresponding to the circuits 20a to 20x, respectively. The output of the OR gate 44 is connected to a control input 40 of a circuit 41 allowing or inhibiting the transmission of the signals passing along the line 1 according to the output of the OR gate 44. This circuit 41 is represented as a switch inserted in the line 1, and is operated through the control input 40. This circuit 41 may also be comprised by an AND gate.

It will be assumed for a more detailed description that the first range corresponds to the circuit 20a, the second range to a circuit 20c (not shown), the third range to the circuit 20d, the fourth range to a circuit 20e (not shown), and the fifth range to the circuit 20x, respectively.

As an example let us further assume that the comparison made by the first comparator 4 on the sign bits is made with respect to the + sign. If three successive amplitudes bearing the + sign on the communication channel 1, the first comparator 4 supplies three signals on its first terminal 5 and these signals are counted by the first counter 8. When the sign of the samples changes, i.e, in this case for the fourth sample which bears the − sign, a signal appears on the second terminal 6 of the comparator 4 for enabling the AND gate 12, which also receives the number $n$, in a binary coded form, from the output 10 of the counter 8. The AND gate 12 transmits a signal to the range selector 16. According to the characteristics of the signal which it receives this range selector operates one or several circuits 20a to 20x. It will be noticed that in the present case two circuits will be operated. Thus, by referring to the table above, it can be seen that the number $n$ which is equal to three in this case, corresponds simultaneously to the second and third ranges of values, viz. $1<n<4$ and $2<n<6$. Each of the corresponding circuits, i.e the circuits 20c (not shown) and 20d, will receive an enabling signal. Each circuit operated sends a signal to the corresponding part of the comparator 24 which also receives a signal from the corresponding part of the memory 27 in which is stored the identification of the circuit or circuits previously operated.

If, for example, the circuit 20d was previously selected the comparison circuit 24(d) of the second comparator 24 receives on its second input 25(d), a signal appearing on the first output 26(d) of the memory part 27(d), and said comparison circuit 24(d) generates a signal on its first output 28(d), said signal being counted in the counting circuit 30(d). If the next selection still corresponds to the circuit 20d, the counting value of the counting circuit 30(d) is added by one, and so on until the threshold value corresponding to this circuit is attained, or until this circuit is no more selected.

In the first case, i.e when the corresponding threshold value is attained, the counting circuit 30(d) generates a signal on its output 33(d). This signal is applied to the first input 34(d) of the AND gate 35(d) which also receives an enabling signal from the second output 37(d) of the memory part 27(d), on its second input 36(d), and which generates on its output 38(d) a signal which is applied, on the one hand, to the third or zero return input 39(d) of the counting circuit 30(d) and, on the other hand, to one input of the OR gate 44 which transmits said signal to the control input 40 of the switch 41 for allowing the transmission of the signals, identified as speech signals in this case, on the line 1.

In the second case, i.e when the circuit 20d is no more selected, the comparison circuit 23(d) receives no more signal on its first input 23(d) and generates a signal on its second output 31(d). Said signal is applied to the second input 32(d) of the counting part 30(d) which is returned to zero. In this case, the AND gate 35(d) receives no signal from the counting part 30(d) and generates no signal for the OR gate 44. If said OR gate 44 receives no other signal, from one of outputs 38a to 38x of the others AND gates 35a to 35x, the switch 41 is not operated, and the transmission on the line 1 is inhibited.

The same process is simultaneously followed for the circuit 20c.

If then the selected circuit is the one corresponding to the fifth range, for example, i.e the circuit 20x, the first input 23(x) of the comparison circuit 24(x) receives a signal. Since the previously selected circuit was not the circuit 20x, the second input 25(x) of the comparison circuit 24(x) receives no signal. The output 28(x) applies no signal to the counting input 29(x) of the counting part 30(x). However, if the circuit 20(x) is one more selected, a signal appears on the first output 28(x) of the comparison circuit 24(x) and the count of the counting part 30(x) is added by one. Then the process is repeated until the corresponding threshold value is attained or until this circuit is no more selected. When the threshold value is attained the counting part 30(x) generates, on its output 33(x), a signal which is applied to an AND gate 35 (x) the second input 36(x) of which is enabled by the output 37(x) of the memory part 27(x). The output 38(x) of said AND gate 35(x) is applied to the OR gate 44 which operates the swith 41 for allowing the transmission of the signals on the line 1.

When this circuit is no more selected, the AND gate 35(x) applies no more signal to the OR gate 44.

Assuming now that during one cycle the successive identical signs are distributed in the following way : 3,5,4,3,5,6,4, 4,3,5,3,5,5,4, 3,4,7,2,3,2 . . . , the circuits 20a, 20c, 20d, 20e and 20x are excited according to the following table.

| Selected circuits | Distribution of identical signs | | | | | | | | | |
|---|---|---|---|---|---|---|---|---|---|---|
| | 3 | 5 | 4 | 3 | 5 | 6 | 4 | 4 | 3 | 5 |
| 20a | | | | | | | | | X | |
| 20c | X | | | X | | | | | X | |
| 20d | X | X | X | X | X | | X | X | X | X |
| 20e | | X | X | | X | X | X | X | | X |
| 20x | | | | | | | | | | |

| Selected circuits | Distribution of identical signs | | | | | | | | | |
|---|---|---|---|---|---|---|---|---|---|---|
| | 3 | 5 | 5 | 4 | 3 | 4 | 7 | 2 | 3 | 2 |
| 20a | | | | | | | | X | X | X |
| 20c | X | | | | X | | | | X | |
| 20d | X | X | X | X | X | X | | | X | |
| 20e | | X | X | X | | X | X | | | |
| 20x | | | | | | | | | | |

In this example, the circuits 20a and 20x, corresponding to the first range and the fifth range, respectively, have never been selected. The circuit 20c corresponding to the second range has been selected 1,1,1,1,1, and 3 successive times. The circuit 20d corresponding to the third range has been selected 5,10,1 successive times, and the circuit 20x, corresponding to the fourth range, has been selected 2,4,1,3,2 successive times.

Consequently, during this cycle, only the circuit 20d corresponding to the fourth range has been selected a number of successive times sufficient to attain the threshold value L corresponding to the associated range, i.e. 10 in the present case. Thus, the AND gate 35(d) generates a signal which controls the switch device 41, through the OR gate 44, to allow the transmission of these signals which have been identified as speech signals. The counting part 30(d) is returned to zero and the process is repeated until one or several of the aforesaid circuits 20a to 20x have been successively selected a sufficient number of times to detect the presence of speech signals. If none of the counting values corresponding to the different ranges reaches the associated threshold value, the transmission of signals on the line 1 is not permitted.

What I claim is:

1. A device for detecting occupancy of a telephone communication channel along which pass pulse code modulated telecommunication signals, said device comprising:
   means for extracting cyclically, from samples of pulse-coded signals corresponding to discrete amplitudes of the transmitted signals passing along said channel and comprising several bits, the bit which defines the algebraic sign of each sample,
   first means for comparing the bit corresponding to the sign of the samples present on the channel with a bit of known sign to determine the sign of the samples,
   first means for counting the number $n$ of successive samples bearing the same algebraic sign, whatever the amplitude and whichever the algebraic sign,
   first means defining a plurality different ranges $]n_1$, $n_2[$ of successive integral values, said ranges possibly overlapping one another, the values $n_1$ and $n_2$ limiting said ranges not being included in the respective ranges,
   second means defining for each of said ranges an empirical threshold value L which has been determined to represent speech signals,
   second means for comparing the number $n$ of successive samples bearing the same algebraic sign with said values $n_1$, $n_2$ defining each of said ranges to select at least one range of values comprising said number $n$,
   second means for counting the consecutive times that the different ranges of values comprising the value $n$ are selected,
   third means for comparing the number of consecutive times that the different ranges are selected to the threshold values L respectively associated with the selected ranges, and
   means for controlling the transmission of signals along said channel according to whether said number of consecutive times a range is selected is at least equal to the respective threshold value L.

2. A device according to claim 1, in which said means for cyclically extracting said bit comprises a clock, a selection circuit controlled by said clock and having an input and an output, means connecting said input with said communication channel and means connecting said output with said first counting means.

3. A device according to claim 2, in which said first comparing means has first and second outputs and in which said first counting means comprises a counter having first and second inputs connected respectively to said first and second outputs of said first comparing means, said counter continuing its counting as long as signals of like sign are received and returning to zero when a signal of opposite sign is received.

4. A device according to claim 3, comprising an AND gate having one output, a first input connected with said first comparing means and a second input connected with said first counting means.

5. A device according to claim 4, in which said second comparing means comprises a range selector having several outputs and one input connected with the output of said AND gate, said range selector comparing the output signal of said AND gate with different integral values $n_1$ and $n_2$ respectively delimiting several ranges of values $n_1$, $n_2$.

6. A device according to claim 5, comprising several NAND circuits, the number of which corresponds to the number of different ranges of values, each NAND circuit having one output, a first input connected to a corresponding output of said range selector and a second input serving as a reset input.

7. A device according to claim 6, comprising several decision circuits, the number of which corresponds to the number of said NAND circuits, each of said decision circuits comprising a memory part having first and second outputs and an input connected to the output of the corresponding NAND circuit.

8. A device according to claim 7, in which said third comparing means comprises a comparison circuit having first and second outputs, a first input connected to the output of the corresponding NAND circuit and a second input connected to the first output of the memory part of the corresponding decision circuit.

9. A device according to claim 8, in which said second counting means comprises a counting circuit having an output, and first and second inputs connected respectively to said first and second outputs of said comparison circuits.

10. A device according to claim 9, comprising an AND gate having an output, a first input connected to the output of said counting circuit and a second input connected to the second output of said memory part, and an OR gate having a number of inputs corresponding to the number of decision circuits and one output, said inputs being connected to the outputs of the respective decision circuits.

11. A device for detecting occupancy of a telephone communication channel, which device being connected, in use, in parallel to a channel along which pass pulse-code modulated telecommunication signals corresponding to amplitude samples, respectively comprising several bits one of which represents the sign of the sample, said device comprising a clock;
   a selection circuit controlled by said clock and having one input and one output, said input being connected to the communication channel for extracting from the respective samples passing on said channel the bit which defines the sign of the concerned sample;
   a first comparator, having a first input connected to the output of said selection circuit, and first and second outputs, said comparator comparing the bit corresponding to the sign of the samples successively present on the channel with a bit corresponding to a given sign;
a first counter for the samples of the same sign, having first and second input connected to the first and second outputs of the comparator respectively, and one output, said first counter being returned to zero or continuing its counting according to the output signals of the comparator;
an AND gate having first and second inputs, connected to the second output of the comparator and the one output of the first counter respectively, and one output;
a range selector having one input, which is connected to the output of the AND gate, and several outputs, said range selector comparing the output signal of the AND gate with different integer values $n_1$ and $n_2$ respectively delimiting several ranges of values $n_1, n_2$;
several NAND circuits, the number of which corresponds to the number of ranges of values, each NAND circuit having a first input connected to a corresponding output of the range selector, a second input serving as reset input, and one output;
several decision circuits, the number of which corresponds to the number of NAND circuits, and comprising one input and one output, respectively, said input being connected to the output of the corresponding NAND circuit;
each of said decision circuits comprising:
a memory part having one input and first and second outputs, said input being connected to the output of the corresponding NAND circuit,
a comparison circuit having first and second inputs and first and second outputs, said first and second inputs being connected to the output of the corresponding NAND circuit and to the first output of the memory part, respectively, a counting circuit having first, second and third inputs and one output, said first and second inputs being connected to the first and second outputs of the comparison circuit, respectively, and an AND gate having first and second inputs and one output, said first and second inputs being connected to the output of the counting circuit and to the second output of the memory part, respectively, and said output being connected to the third input of the counting part;
said device further comprising an OR gate having a number of inputs corresponding to the number of decision circuits, and one output, said inputs being connected to the output of each decision circuit, respectively;
and a switch mounted in the channel and having one control input which is connected to the output of said OR gate, said switch controlling the transmission of the samples on said channel in response to the output signal of said OR gate.

* * * * *